US011942746B2

(12) United States Patent
Fujita

(10) Patent No.: US 11,942,746 B2
(45) Date of Patent: Mar. 26, 2024

(54) TERMINAL FEEDER AND CRIMPER

(71) Applicant: Shinmaywa Industries, Ltd., Takarazuka (JP)

(72) Inventor: Seiichirou Fujita, Takarazuka (JP)

(73) Assignee: SHINMAYWA INDUSTRIES, LTD., Hyogo (JP)

( * ) Notice: Subject to any disclaimer, the term of this patent is extended or adjusted under 35 U.S.C. 154(b) by 400 days.

(21) Appl. No.: 17/359,692

(22) Filed: Jun. 28, 2021

(65) Prior Publication Data

US 2021/0408751 A1 Dec. 30, 2021

(30) Foreign Application Priority Data

Jun. 30, 2020 (JP) ................................ 2020-112542

(51) Int. Cl.
*H01R 43/055* (2006.01)

(52) U.S. Cl.
CPC ...... *H01R 43/055* (2013.01); *Y10T 29/53213* (2015.01)

(58) Field of Classification Search
CPC .. H01R 43/055; H01R 43/0482; H01R 43/16; Y10T 29/53235; Y10T 29/5303; Y10T 29/53061; Y10T 29/53213
USPC .................. 29/748, 707, 714, 747, 751, 753
See application file for complete search history.

(56) References Cited

U.S. PATENT DOCUMENTS 4,907,343 A * 3/1990 Dolan .................. H01R 43/055 29/714

FOREIGN PATENT DOCUMENTS

| | | | |
|---|---|---|---|
| JP | 04-12442 | U | 1/1992 |
| JP | 04-054999 | Y2 | 12/1992 |
| JP | 09-321490 | A | 12/1997 |
| JP | 11-3763 | A | 1/1999 |
| JP | 2002-274707 | A | 9/2002 |
| JP | 2003-282213 | A | 10/2003 |
| JP | 2003-317895 | A | 11/2003 |
| JP | 2009-218068 | A | 9/2009 |
| JP | 2009218068 | * | 9/2009 |

* cited by examiner

*Primary Examiner* — Thiem D Phan
(74) *Attorney, Agent, or Firm* — Keating & Bennett, LLP

(57) ABSTRACT

A terminal feeder and crimper includes a support to rotatably support a terminal strip reel obtained by winding together a terminal strip and an interleaf on top of each other, a crimper to crimp a terminal of the terminal strip onto a wire, a terminal strip feeder to feed the terminal strip dispensed from the terminal strip reel to the crimper, an interleaf take-up reel to take up the interleaf dispensed from the terminal strip reel, and a driver connected to the interleaf take-up reel to rotate the interleaf take-up reel. The driver is capable of changing a rotational torque to be applied to the interleaf take-up reel.

9 Claims, 7 Drawing Sheets

TERMINAL FEEDER AND CRIMPER

CROSS REFERENCE TO RELATED APPLICATIONS

The present application claims the benefit of priority to Japanese Patent Application No. 2020-112542 filed on Jun. 30, 2020, the entire contents of which are incorporated herein by reference.

BACKGROUND OF THE INVENTION

1. Field of the Invention

The present invention relates to a terminal feeder and crimper.

2. Description of the Related Art

Terminal strip reels for continuously or intermittently feeding many terminals to crimpers have been known in the art. A terminal strip reel is a winding of a terminal strip that includes many terminals strung together in a strip form. A terminal strip reel includes a strip-shaped interleaf wound around between layers of the terminal strip to prevent the terminals from becoming entangled. A terminal strip reel includes a terminal strip and an interleaf wound around together on top of each other.

A terminal feeder and crimper for dispensing a terminal strip from a terminal strip reel and crimping terminals from the dispensed terminal strip onto wires has been known in the art. For example, JP 2009-218068A discloses a terminal feeder and crimper including a terminal strip feeder and a terminal crimper, wherein the terminal strip feeder includes a driver for dispensing a terminal strip from a terminal strip reel, and the terminal crimper includes a feed jaw for feeding a terminal strip into a terminal crimping die. In the terminal strip feeder described in JP 2009-218068A, the driver for dispensing the terminal strip from the terminal strip reel is an interleaf take-up device for taking up the interleaf. According to JP 2009-218068A, when the interleaf take-up reel of the interleaf take-up device is rotated by a motor, the terminal strip reel is rotated as a result of the operation of taking up the interleaf, and the terminal strip is dispensed from the terminal strip reel.

According to the configuration of JP 2009-218068A, it is believed that the terminal strip is dispensed from the terminal strip reel by the interleaf take-up device, thus reducing the load upon the terminal strip by the driving of the feed jaw of the terminal crimper. When the interleaf take-up device does not support the dispensing of the terminal strip, the terminal strip is dispensed from the terminal strip reel by the feed jaw. Therefore, the load that the terminal strip receives from the feed jaws is large. This increases the risk of damaging the terminal due to the load.

However, according to the configuration in which the terminal strip reel is rotated by the interleaf take-up device as described in JP 2009-218068A, when the interleaf take-up device is driven simply to remove slack from the interleaf, for example, the terminal strip reel, which does not need to be rotated, may be rotated. In other cases, when the user wants to rotate the interleaf take-up reel when replacing the terminal strip reel, for example, it is difficult to do so with the user's arm strength because of the load (braking force) of the motor. While the interleaf take-up reel can be rotated by the driving force of the motor, it then requires buttons, wires, control programs, etc., for example. In other words, according to the terminal feeder and crimper described in JP 2009-218068A, it is possible to reduce the load applied to the terminal by the terminal strip feeder while feeding the terminal strip by driving the interleaf take-up device, but this instead restricts the free operation of the interleaf take-up reel.

SUMMARY OF THE INVENTION

Preferred embodiments of the present invention provide terminal feeders and crimpers, with each of which it is possible to reduce the load applied to the terminal while feeding the terminal strip and to allow the interleaf take-up reel to be operated more freely when desired.

A terminal feeder and crimper according to a preferred embodiment of the present invention includes a support to rotatably support a terminal strip reel obtained by winding together a terminal strip and an interleaf on top of each other, a crimper to crimp a terminal of the terminal strip onto a wire, a terminal strip feeder to feed the terminal strip dispensed from the terminal strip reel to the crimper, an interleaf take-up reel to take up the interleaf dispensed from the terminal strip reel, and a driver connected to the interleaf take-up reel to rotate the interleaf take-up reel. The driver is capable of changing a rotational torque to be applied to the interleaf take-up reel.

With the terminal feeder and crimper described above, since the driver is capable of changing the rotational torque to be applied to the interleaf take-up reel, it is possible to support the rotation of the terminal strip reel by applying a relatively large rotational torque to the interleaf take-up reel. Thus, it is possible to reduce the load applied to terminals by the terminal strip feeder when feeding the terminal strip. On the other hand, when desired, it is possible to apply only a relatively small rotational torque to the interleaf take-up reel, thus allowing the interleaf take-up reel to be operated more freely.

In a second aspect of a terminal feeder and crimper according to a preferred embodiment of the present invention, the driver is capable of applying, to the interleaf take-up reel, at least two different rotational torques, including a first torque that is sufficient to rotate the terminal strip reel about the support and a second torque that is smaller than the first torque and is insufficient to rotate the terminal strip reel about the support.

With such a terminal feeder and crimper, since the terminal strip reel does not rotate when the second torque is applied to the interleaf take-up reel, it is possible to prevent the terminal strip reel from rotating unnecessarily when the driver is driven to rotate the interleaf take-up reel.

In a third aspect of a terminal feeder and crimper according to the second aspect of a preferred embodiment of the present invention, the feeder and crimper further includes a controller that is connected to the driver and includes an interface used to perform a feed start operation to start feeding the terminal strip. The controller is configured or programmed to control the driver to apply the second torque to the interleaf take-up reel when the feed start operation is performed.

With such a terminal feeder and crimper, a slack portion of the interleaf can be taken up, by rotating the interleaf take-up reel before the start of feeding the terminal strip, without unnecessarily rotating the terminal strip reel.

In a fourth aspect of a terminal feeder and crimper according to a preferred embodiment of the present invention, the driver includes a rotation shaft that rotates. The rotation shaft includes a first connecting portion that can be selectively engaged with or disengaged from the interleaf take-up reel, and a second connecting portion that is secured by a frictional force to the interleaf take-up reel when a rotational load on the interleaf take-up reel is less than a predetermined first load, and slips against the interleaf take-up reel when the rotational load on the interleaf take-up reel is equal to or greater than the first load.

With such a terminal feeder and crimper, if the first connecting portion is connected to the interleaf take-up reel, the rotational torque of the rotation shaft can be transmitted to the interleaf take-up reel, so that a relatively large rotational torque can be applied to the interleaf take-up reel. If the first connecting portion is disengaged from the interleaf take-up reel, the rotation shaft slips against the interleaf take-up reel when the rotational load on the interleaf take-up reel is equal to or greater than the first load. Therefore, the driver can transmit, to the interleaf take-up reel, a rotational torque only up to the rotational torque corresponding to the first load. Therefore, with such a configuration, the rotational torque applied by the driver to the interleaf take-up reel can be easily changed.

In a fifth aspect of a terminal feeder and crimper according to the fourth aspect of a preferred embodiment of the present invention, the first connecting portion includes a movable shaft capable of being positioned in a first position and a second position that is closer to the interleaf take-up reel than the first position. The interleaf take-up reel has an engagement hole, wherein the movable shaft is inserted into the engagement hole when the movable shaft is positioned in the second position, and the movable shaft is detached from the engagement hole when the movable shaft is positioned in the first position.

With such a terminal feeder and crimper, the first connecting portion can be connected and disconnected from the interleaf take-up reel by a simple configuration of inserting and detaching the movable shaft into and from the engagement hole. That is, the rotational torque to be applied to the interleaf take-up reel by the driver can be easily changed by the simple configuration of inserting and detaching the movable shaft into and from the engagement hole.

In a sixth aspect of a terminal feeder and crimper according to the fourth aspect or the fifth aspect of a preferred embodiment of the present invention, the driver further includes a drive motor that includes a drive shaft that rotates, a first pulley that is connected to the drive shaft, a second pulley that is connected to the rotation shaft, and an endless belt that is wound between the first pulley and the second pulley. The endless belt is configured to slip against at least one of the first pulley and the second pulley when the rotational load on the interleaf take-up reel is equal to or greater than a second load that is larger than the first load.

With such a terminal feeder and crimper, even if the rotational load on the interleaf take-up reel increases abnormally for some reason, the belt slips against at least one of the first pulley and the second pulley, so that the first connecting portion, etc., will not be overloaded. Thus, it is possible to reduce or prevent damage to the first connecting portion, etc.

In a seventh aspect of a terminal feeder and crimper according to a preferred embodiment of the present invention, the feeder and crimper further includes a detector to detect a force applied to the terminal strip by the terminal strip feeder when feeding the terminal strip, and a warning device that is connected to the detector to issue a warning when the force detected by the detector has exceeded a predetermined force over an amount of time that exceeds a predetermined amount of time.

In the case of an abnormality where the driver does not apply an expected rotational torque to the interleaf take-up reel, the interleaf take-up device does not support the rotation of the terminal strip reel as expected, and the force detected by the detector may continuously exceed a predetermined force. Therefore, by detecting a situation where the force detected by the detector has exceeded a predetermined force over an amount of time that exceeds the predetermined amount of time, it is possible to detect some of the abnormalities that exceed a predetermined limit. With such a terminal feeder and crimper, it is possible to detect an abnormality as described above, and to warn the user that an abnormality has occurred.

In an eighth aspect of a terminal feeder and crimper according to a preferred embodiment of the present invention, the driver is capable of changing a braking force on the interleaf take-up reel when the interleaf take-up reel is stopped.

With such a terminal feeder and crimper, since the driver is capable of changing a braking force to be applied to the interleaf take-up reel, it is possible to allow the interleaf take-up reel to be operated more freely by adding a relatively small braking force to the interleaf take-up reel when desired.

In a ninth aspect of a terminal feeder and crimper according to the eighth aspect of a preferred embodiment of the present invention, the driver is capable of applying, to the interleaf take-up reel, such a braking force that allows the interleaf take-up reel to be manually rotated against the braking force.

With such a terminal feeder and crimper, since the driver is capable of adjusting the braking force applied to the interleaf take-up reel to such a braking force that allows the interleaf take-up reel to be manually rotated, it is possible to add such a small braking force to the interleaf take-up reel so that the interleaf take-up reel can be operated manually when desired.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the drawings. It is understood that the preferred embodiments described below are not intended to limit the present invention. Members/parts that perform the same function are denoted by the same reference signs, and redundant explanations will be omitted or simplified as appropriate.

First Preferred Embodiment

Figure 1:
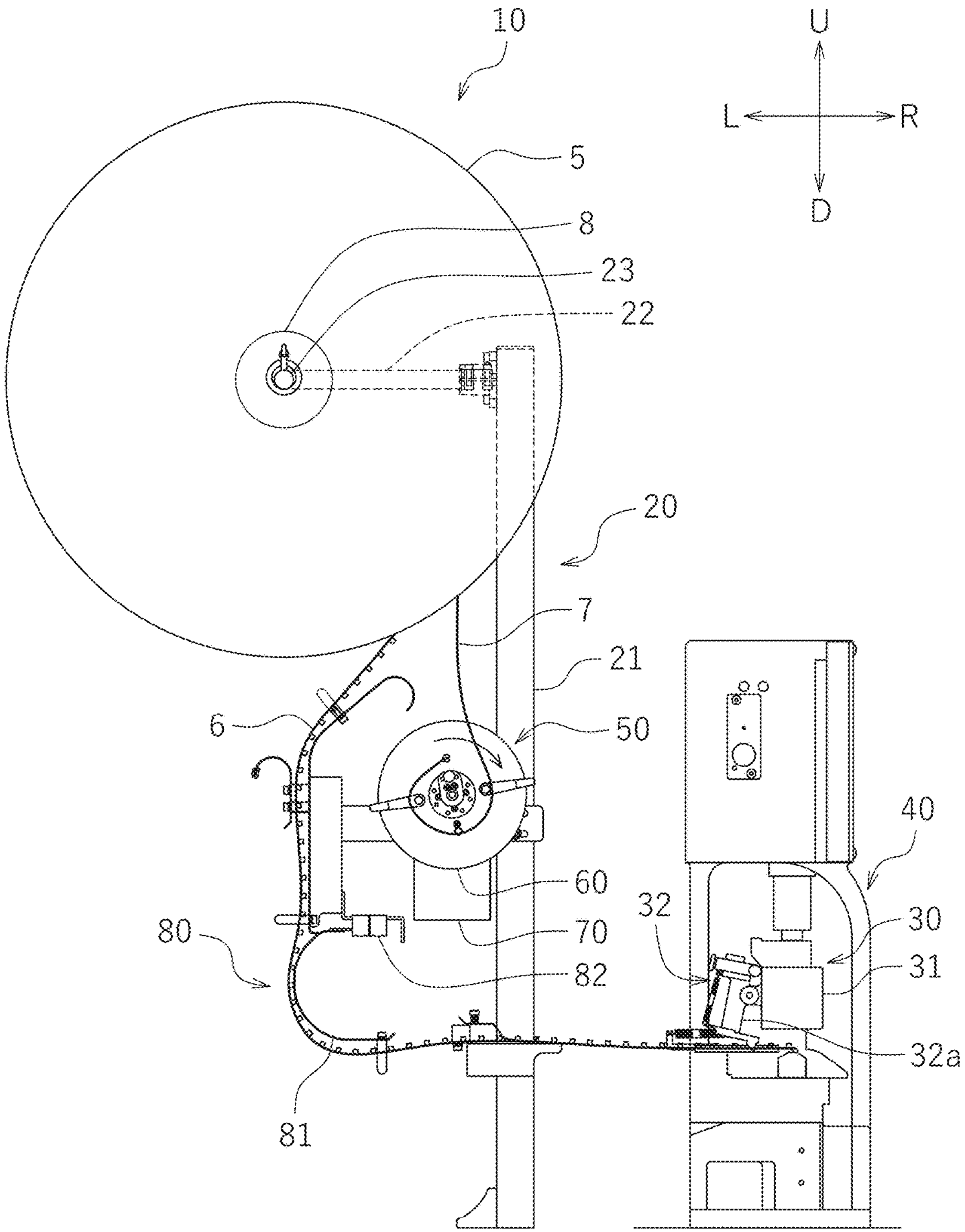
FIG. 1 is a schematic front view of a terminal feeder and crimper according to a first preferred embodiment of the present invention.

FIG. 1 is a schematic front view of a terminal feeder and crimper 10 (hereinafter simply referred to as the feeder and crimper 10) according to a preferred embodiment of the present invention. In the description below, the direction of the rotation axis of a terminal strip reel 5 is the front-rear direction, and the direction in which a terminal strip 6 is fed out, of the horizontal direction, is the rightward direction, unless specified otherwise. The designations F, Rr, L, R, U and D, as used in the figures, refer to front, rear, left, right, up and down, respectively. However, these directions are defined only for the purpose of discussion and do not in any way limit the installation of the feeder and crimper 10, and do not in any way limit the scope of the present invention.

Figure 5:
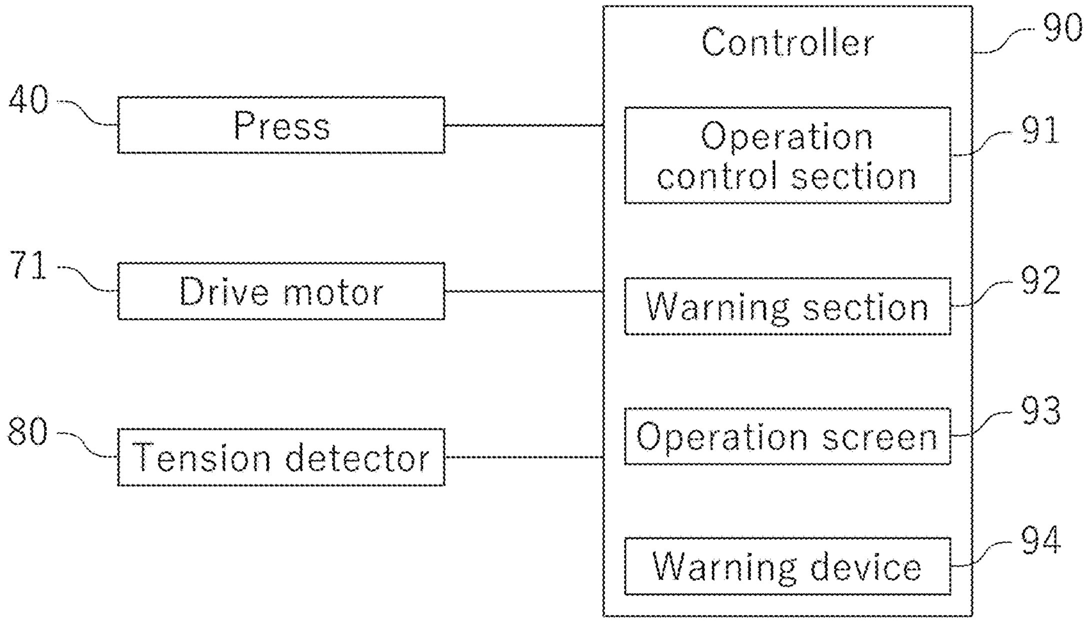
FIG. 5 is a block diagram of the feeder and crimper.

As shown in FIG. 1, the feeder and crimper 10 according to the present preferred embodiment includes a support 20 that supports the terminal strip reel 5, an applicator 30, a press 40, an interleaf take-up device 50, a tension detector 80 and a controller 90 (see FIG. 5).

As shown in FIG. 1, the terminal strip reel 5 is obtained by winding together the terminal strip 6 in the form of a strip and an interleaf 7 in the form of a strip on top of each other, and is configured to be in a generally circular shape as viewed in the winding axial direction (as viewed in the front-rear direction in FIG. 1). The terminal strip 6 includes a plurality of terminals strung together in a strip form.

The support 20 rotatably supports the terminal strip reel 5. The support 20 includes a pillar 21, a horizontal arm 22, and a rotor 23. The pillar 21 extends in the vertical direction. The horizontal arm 22 is connected to the pillar 21 and extends in the left-right direction. The rotor 23 is provided at the open end of the horizontal arm 22 (the end opposite to the end engaged to the pillar 21), and is supported by the horizontal arm 22 so as to be rotatable in the left-right direction. A core 8 of the terminal strip reel 5 is inserted into the rotor 23. Thus, the terminal strip reel 5 is supported by the support 20 so as to be rotatable in the left-right direction. Note however that the support 20 is not limited thereto as long as it is capable of rotatably supporting the terminal strip reel 5.

The applicator 30 is a device for crimping terminals of the terminal strip 6 onto wires while dispensing them from the terminal strip reel 5. The applicator 30 includes a crimper 31 and a terminal strip feeder 32. The crimper 31 is a device for crimping terminals of the terminal strip 6 onto wires. The crimper 31 may be any of various crimpers known in the art. Here, the crimper 31 includes a movable part (not shown) that includes a tooth mold for crimping terminals and is movable in the up-down direction. The press 40 presses the movable part of the crimper 31 downward. Thus, a terminal is crimped onto a wire. The terminal strip feeder 32 is configured to feed the terminal strip 6 dispensed from the terminal strip reel 5 to the crimper 31. The terminal strip feeder 32 is provided on the support 20 side relative to the crimper 31, i.e., leftward. As shown in FIG. 1, the terminal strip feeder 32 includes a feed jaw 32*a* for feeding the terminal strip 6 dispensed from the terminal strip reel 5 to the crimper 31. The feed jaw 32*a* swings in the left-right direction in conjunction with the terminal crimping operation of the crimper 31 caused by driving the press 40. The terminal strip feeder 32 feeds the terminal strip 6 rightward by engaging the feed jaw 32*a*, which swings in the left-right direction, with the terminal strip 6. Thus, the terminal strip 6 dispensed from the terminal strip reel 5 is fed to the crimper 31.

The interleaf take-up device 50 is a device that winds up the interleaf 7 dispensed from the terminal strip reel 5 together with the terminal strip 6. As shown in FIG. 1, the interleaf take-up device 50 includes an interleaf take-up reel 60 for taking up the interleaf 7 dispensed from the terminal strip reel 5, and a driver 70 for rotating the interleaf take-up reel 60. The driver 70 is connected to the interleaf take-up reel 60 and is configured to provide a rotational torque to the interleaf take-up reel 60.

Figure 2:
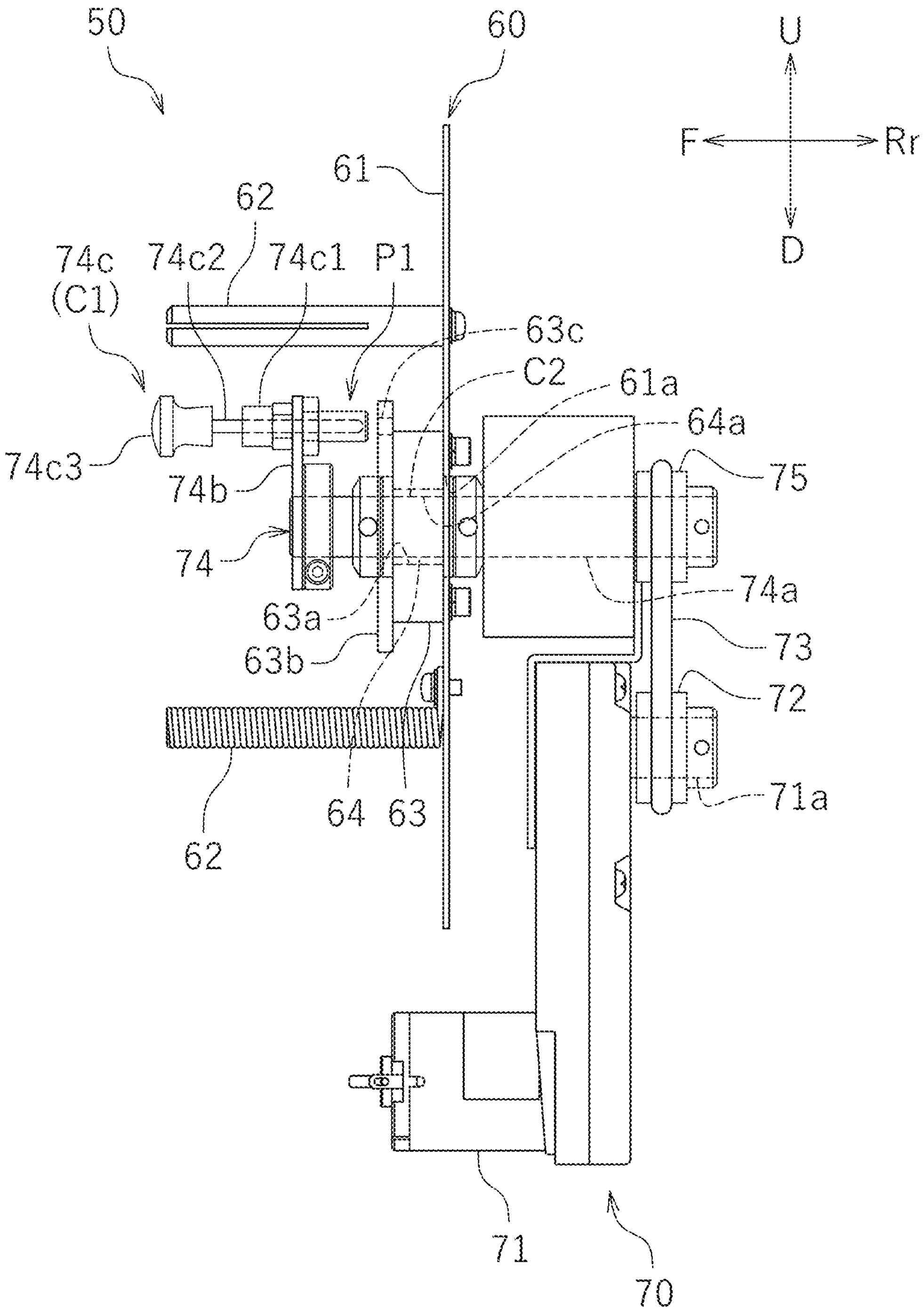
FIG. 2 is a right side view of an interleaf take-up device.
Figure 3:
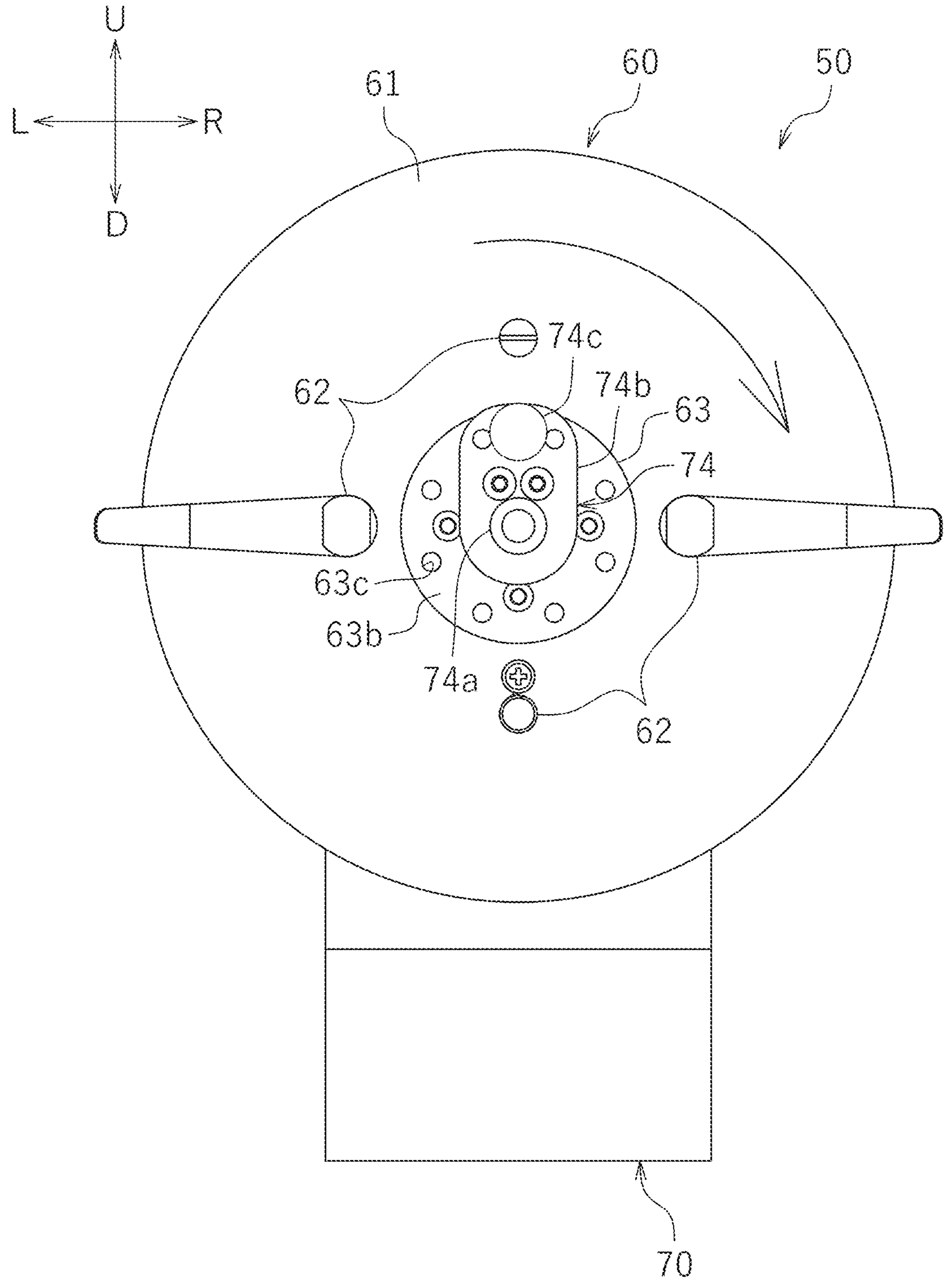
FIG. 3 is a front view of the interleaf take-up device.

FIG. 2 is a right side view of the interleaf take-up device 50. FIG. 3 is a front view of the interleaf take-up device 50. As shown in FIGS. 2 and 3, the interleaf take-up reel 60 includes a take-up disc 61, a plurality of take-up shafts 62 and a force receiving section 63. The take-up disc 61 is configured to be in a generally circular shape as viewed from the front or rear. The central axis of the take-up disc 61 extends in the front-rear direction. The central axis of the take-up disc 61 and the central axis of the terminal strip reel 5 are parallel or substantially parallel to each other. A central hole 61*a* penetrating in the front-rear direction is formed around the central axis of the take-up disc 61.

The take-up shafts 62 are each fixed to the take-up disc 61. The take-up shafts 62 extend forward from the front surface of the take-up disc 61. The number of take-up shafts 62 is herein four. The four take-up shafts 62 are disposed 90 degrees apart from each other on a single circumference around the central axis of the take-up disc 61.

The force receiving section 63 is provided at the central portion of the take-up disc 61 in the radial direction. The force receiving section 63 is formed in a generally cylindrical shape. As shown in FIG. 2, the force receiving section 63 includes a central hole 63*a* penetrating in the front-rear direction. The force receiving section 63 is fixed to the take-up disc 61 so that the central axis of the central hole 63*a* coincides with the central axis of the take-up disc 61. Here, the force receiving section 63 is fixed to the front surface of the take-up disc 61 and extends forward from the take-up disc 61.

As shown in FIG. 2, a generally cylindrical collar 64 is inserted into the central hole 63*a* of the force receiving section 63. The collar 64 has a central hole 64*a* that penetrates in the front-rear direction. The central axis of the central hole 64*a* coincides with the central axis of the take-up disc 61 and the central axis of the force receiving section 63. Here, the collar 64 is fixed non-rotatably to the central hole 63*a* of the force receiving section 63. The collar 64 may be fixed to the central hole 63*a* by being driven into the central hole 63*a*, for example, or it may be fixed by other means, e.g., a set screw. In the present preferred embodiment, the collar 64 is made of a resin.

As shown in FIG. 2, the force receiving section 63 includes a flange-shaped force receiving plate 63*b*. The force receiving plate 63*b* extends outward in the radial direction of the force receiving section 63 relative to other portions of the force receiving section 63. A plurality of engagement holes 63*c* are formed in the force receiving plate 63*b*. Here, the engagement holes 63*c* penetrate through the force receiving plate 63*b* in the front-rear direction. Note however that the engagement holes 63*c* do not have to be through holes but may be non-penetrating depressions. The number of engagement holes 63*c* may be one. Here, a plurality of engagement holes 63*c* are arranged at an equal angle apart from each other on a single circumference around the central axis of the force receiving section 63.

As shown in FIG. 2, the driver 70 includes a drive motor 71, a first pulley 72, a belt 73, a rotation shaft 74 and a second pulley 75. Herein, the drive motor 71 is a DC motor that does not have the function of changing the rotational torque. Note however that the type of the drive motor 71 is not limited thereto. The drive motor 71 includes a drive shaft 71*a* that rotates. The drive shaft 71*a* extends in the front-rear direction and rotates in the left-right direction. The first pulley 72 is connected to the drive shaft 71*a* and rotates together with the drive shaft 71*a*.

The belt 73 is an endless belt and is wound between the first pulley 72 and the second pulley 75. In the present preferred embodiment, the belt 73 is a round belt whose cross-sectional shape is generally circular. Note however that the type of the belt 73 is not limited thereto. For example, the belt 73 may be a flat belt whose cross-sectional shape is generally rectangular.

The rotation shaft 74 is configured in a generally cylindrical shape, and the axis thereof extends in the front-rear direction. The second pulley 75 is connected to the rotation shaft 74. The rotation shaft 74 receives power from the drive motor 71 via the first pulley 72, the belt 73 and the second pulley 75 to rotate about the axis. As shown in FIG. 2, the rotation shaft 74 includes a main shaft 74*a*, a bracket 74*b* and a plunger 74*c*. The second pulley 75 is connected in the vicinity of the rear end of the main shaft 74*a*. A portion of the section of the main shaft 74*a* that is forward relative to the second pulley 75 is inserted into the central hole 61*a* of the take-up disc 61 and the central hole 64*a* of the collar 64. The main shaft 74*a* is in contact with the central hole 64*a* of the collar 64. The central hole 61*a* of the take-up disc 61 is formed larger than the main shaft 74*a* as viewed in the front-rear direction, and is not in contact with the main shaft 74*a*.

As shown in FIG. 2, the front end of the main shaft 74*a* is located forward relative to the force receiving section 63. A bracket 74*b* is provided at the front end of the main shaft 74*a*. The bracket 74*b* is formed in a flat plate shape. The bracket 74*b* extends generally perpendicular to the axis of the main shaft 74*a* and rotates together with the main shaft 74*a*. A portion of the bracket 74*b* extends outward in the radial direction of the main shaft 74*a* relative to the main shaft 74*a*. The bracket 74*b* and the force receiving plate 63*b* of the force receiving section 63 are provided generally parallel to each other.

The plunger 74*c* is attached to the bracket 74*b*. The plunger 74*c* is a rod-shaped member and extends generally perpendicular to the bracket 74*b*, in other words, generally parallel to the axis of the main shaft 74*a*. As shown in FIG. 2, the plunger 74*c* includes a tubular case 74*c*1, a movable shaft 74*c*2 partially housed in the case 74*c*1, and a spring (not shown) housed in the case 74*c*1. The case 74*c*1 is attached to the bracket 74*b*. The movable shaft 74*c*2 is movable in the front-rear direction along the inner periphery of the case 74*c*1. The movable shaft 74*c*2 is biased by a spring toward the force receiving plate 63*b* (herein, backward). By grasping a grip 74*c*3 at the front end of the movable shaft 74*c*2, the user can move the movable shaft 74*c*2 toward the opposite side of the force receiving plate 63*b* (herein, forward) against the biasing force of the spring.

The movable shaft 74*c*2 is rotatable in the left-right direction relative to the case 74*c*1. The movable shaft 74*c*2 is configured to engage with the case 74*c*1 when it is positioned at a predetermined rotation position while being pulled forward. By such an engagement, the position of the movable shaft 74*c*2 in the front-rear direction is fixed against the biasing force of the spring. Thus, the movable shaft 74*c*2 is configured so that it can be positioned in a first position P1 (see FIG. 2) where it is engaged with the case 74*c*1, and a second position P2 (see FIG. 4) that is closer to the interleaf take-up reel 60 than the first position P1.

Figure 4:
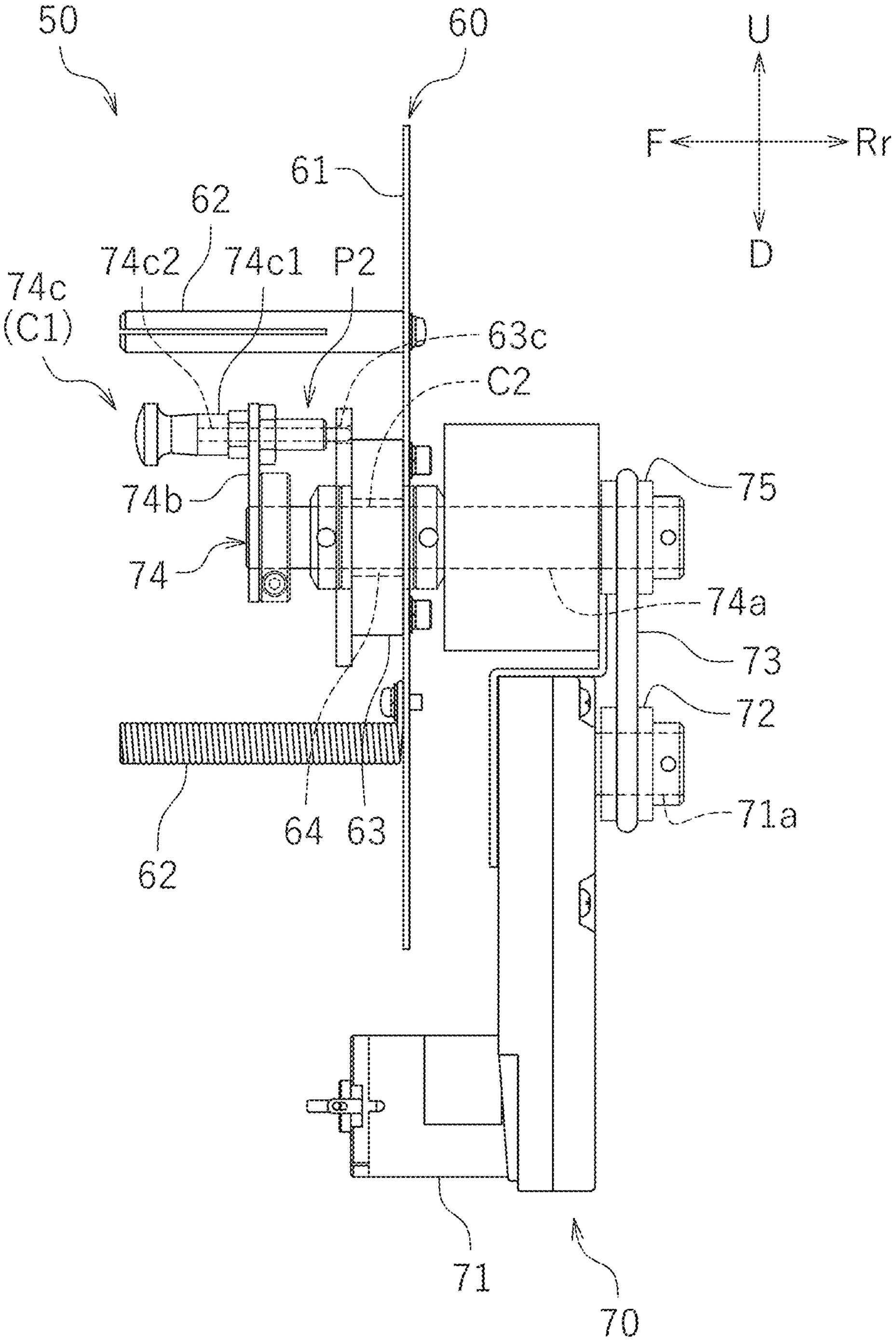
FIG. 4 is a right side view of the interleaf take-up device with a movable shaft of a plunger inserted into an engagement hole.

The plunger 74*c* is arranged so as to overlap with the circumference where the engagement holes 63*c* are arranged as viewed in the front-rear direction. FIG. 4 is a right side view of the interleaf take-up device 50 with the movable shaft 74*c*2 of the plunger 74*c* inserted into the engagement hole 63*c*. As shown in FIG. 4, the movable shaft 74*c*2 is inserted into the engagement hole 63*c* when it is positioned in the second position P2. As shown in FIG. 2, the movable shaft 74*c*2 is detached from the engagement hole 63*c* when it is positioned in the first position P1. When engaging the plunger 74*c* with the engagement hole 63*c*, the user, for example, releases the engagement of the movable shaft 74*c*2 with the case 74*c*1 and then rotates the interleaf take-up reel 60. Thus, the movable shaft 74*c*2 is inserted into an adjacent engagement hole 63*c* in the rotation direction. When releasing the engagement between the plunger 74*c* and the engagement hole 63*c*, the user positions the movable shaft 74*c*2 in the first position P1 and engages it with the case 74*c*1.

As the movable shaft 74*c*2 of the plunger 74*c* is inserted into the engagement hole 63*c*, the rotation shaft 74 and the interleaf take-up reel 60 are engaged. Thus, it is possible to transmit substantially all of the rotational force of the rotation shaft 74 to the interleaf take-up reel 60. The plunger 74*c* defines the first connecting portion C1 of the rotation shaft 74, which can be selected to be engaged with or disengaged from the interleaf take-up reel 60.

A portion of the rotational force of the rotation shaft 74 is transmitted to the interleaf take-up reel 60 also by the frictional force between the main shaft 74*a* and the collar 64. The contact portion of the main shaft 74*a* with the collar 64 defines the second connecting portion C2 of the rotation shaft 74, which transmits the rotational torque of the rotation shaft 74 to the interleaf take-up reel 60. When the rotational load on the interleaf take-up reel 60 is less than a predetermined load (hereinafter referred to as the first load), the second connecting portion C2 is secured by a frictional force to the interleaf take-up reel 60 (more specifically, the collar 64). In other words, there is no slippage between the second connecting portion C2 and the interleaf take-up reel 60. As a result, the interleaf take-up reel 60 rotates together with the rotation shaft 74. When the rotational load on the interleaf take-up reel 60 is equal to or greater than the first load, the second connecting portion C2 slips against the collar 64. Therefore, when the rotational load on the interleaf take-up reel 60 is equal to or greater than the first load and the first connecting portion C1 and the interleaf take-up reel 60 are not engaged with each other, the interleaf take-up reel 60 does not rotate together with the rotation shaft 74.

As shown in FIG. 1, a tension detector 80 is provided in the path of the terminal strip 6 between the terminal strip reel 5 and the terminal strip feeder 32. The tension detector 80 is configured to detect the force applied to the terminal strip 6 by the terminal strip feeder 32 when feeding the terminal strip 6. Here, the tension detector 80 detects whether the tension of the terminal strip 6 dispensed from the terminal strip reel 5 exceeds a predetermined tension. When the amount by which the terminal strip reel 5 has been rotated by the interleaf take-up device 50 (the length by which the terminal strip 6 has been dispensed) is greater than the amount by which the terminal strip 6 has been fed by the terminal strip feeder 32, the terminal strip 6 slacks. In the opposite case, the terminal strip 6 is tensioned. Thus, the tension of the terminal strip 6 fluctuates.

As shown in FIG. 1, the tension detector 80 includes a guide member 81 for guiding the terminal strip 6 therealong. The guide member 81 is movable in the left-right direction. The guide member 81 is biased leftward by a spring (not shown). When the terminal strip 6 is tensioned, the guide member 81 moves rightward against the biasing force of the spring by being pulled by the terminal strip 6. The tension detector 80 includes an optical sensor 82 for detecting the guide member 81. When the terminal strip 6 is tensioned with a tension that exceeds a predetermined tension, thus moving the guide member 81 rightward by more than a distance corresponding to the predetermined tension, the optical sensor 82 detects the guide member 81. Thus, it is possible to detect the tension of the terminal strip 6 exceeding the predetermined tension. The tension detector 80 is configured to send a signal when the optical sensor 82 detects the guide member 81.

The feeder and crimper 10 includes the controller 90 that controls the operation of the press 40 and the interleaf take-up device 50 and also receives a signal from the tension detector 80. FIG. 5 is a block diagram of the feeder and crimper 10. As shown in FIG. 5, the controller 90 is connected to the press 40, the drive motor 71 of the interleaf take-up device 50 and the tension detector 80. The crimper 31 and the terminal strip feeder 32 operate in conjunction with the operation of the press 40. There is no particular limitation on the configuration of the controller 90. For example, the controller 90 may include a central processing unit (CPU), a ROM storing a program or the like to be executed by the CPU, a RAM, etc. Each section of the controller 90 may be implemented by software or may be implemented by hardware. Each section may be a processor or may be a circuit.

As shown in FIG. 5, the controller 90 is configured or programmed to include an operation control section 91, a warning section 92, an operation screen 93 and a warning device 94. The operation control section 91 controls the operation of the press 40 and the interleaf take-up device 50 so as to feed and crimp terminals. Details of the operation of the feeder and crimper 10 will be described later. The warning section 92 is connected to the tension detector 80 and is set to issue a warning signal when the force detected by the tension detector 80 exceeds a predetermined force over a predetermined amount of time. Specifically, the warning section 92 issues a warning signal when a signal from the tension detector 80 has been received continuously over an amount of time that exceeds the predetermined amount of time. The warning section 92 may issue warning signals in other cases, but this will not be described herein. Upon receiving a warning signal issued by the warning section 92, the warning device 94 issues a warning to the user. The warning device 94 includes a buzzer and/or a warning indicator light, for example. Note however that there is no particular limitation on the configuration of the warning device 94. The warning may include stopping the operation of the feeder and crimper 10.

The operation screen 93 is an example of an interface used to perform operations such as the operation of starting and pausing the feeding of the terminal strip 6 and the operation of independently driving the interleaf take-up device 50, for example. Note however that the interface used to perform various operations of the feeder and crimper 10 is not limited to the operation screen displayed on the display. Part or whole of the interface used to perform various operations of the feeder and crimper 10 may include mechanical buttons and switches, for example. Note that the controller 90 may include other processing sections for other functions, but they will not be described or illustrated herein.

The operation of the feeder and crimper 10 for feeding the terminal strip 6 from the terminal strip reel 5 and crimping the terminal strip 6 will now be described. For feeding the terminal strip 6 from the terminal strip reel 5, the user first sets the terminal strip reel 5 on the support 20. Then, the user dispenses the terminal strip 6 and interleaf 7 from the terminal strip reel 5. The dispensed terminal strip 6 is set in the applicator 30 via the tension detector 80. The dispensed interleaf 7 is set on the interleaf take-up reel 60. More specifically, the interleaf 7 is set on one of the take-up shafts 62 so as to be wound on the take-up shafts 62.

As shown in FIG. 2, when the interleaf 7 (see FIG. 1) is set on the interleaf take-up reel 60, the plunger 74*c* preferably is not engaged with the interleaf take-up reel 60. In such a state, the user can freely rotate the interleaf take-up reel 60. In such a state, the user can easily rotate the interleaf take-up reel 60 because the driver 70 and the interleaf take-up reel 60 are connected to each other only by the frictional force between the second connecting portion C2 and the collar 64. In other words, in such a state, the second connecting portion C2 of the driver 70 is applying, to the interleaf take-up reel 60, only such a braking force that allows the user to manually rotate the interleaf take-up reel 60 against the force. Therefore, the user can freely manually rotate the interleaf take-up reel 60. The braking force that can allow the interleaf take-up reel 60 to be manually rotated is about 0.1 N or less, for example.

By being able to freely manually rotate the interleaf take-up reel 60, the user can easily set the interleaf 7 on the interleaf take-up reel 60. After the interleaf 7 is set, the user can manually rotate the interleaf take-up reel 60 to take up the slack interleaf 7.

The user then engages the plunger 74*c* with the interleaf take-up reel 60. Thus, it is possible to transmit almost all of the rotational torque of the rotation shaft 74 to the interleaf take-up reel 60. The braking force applied from the driver 70 to the interleaf take-up reel 60 in this state may be a braking force such that the user cannot manually rotate the interleaf take-up reel 60. Note however that it may be possible, even in such a state, to manually rotate the interleaf take-up reel 60. Thus, the driver 70 is capable of changing the braking force on the interleaf take-up reel 60 when it is stopped, depending on whether the plunger 74*c* is engaged with the interleaf take-up reel 60.

Thereafter, the user uses the operation screen 93 to start the feeding/crimping operation of the terminal strip 6. In the feeding/crimping operation of the terminal strip 6, the terminal strip 6 is fed to the crimper 31 by the terminal strip feeder 32. Terminals of the terminal strip 6 fed to the crimper 31 are crimped onto wires. When the terminal strip 6 is fed and tensioned, and the tension of the terminal strip 6 becomes equal to or greater than a predetermined tension, the tension detector 80 outputs a signal. The controller 90 receives a signal issued by the tension detector 80 in response to the tension of the terminal strip 6 being equal to or greater than the predetermined tension. Upon receiving the signal from the tension detector 80, the operation control section 91 of the controller 90 drives the drive motor 71. This causes the interleaf take-up reel 60 to rotate together with the rotation shaft 74. The interleaf 7 is pulled out from the terminal strip reel 5 by being taken up onto the interleaf take-up reel 60. This rotates the terminal strip reel 5 and supports the dispensing of the terminal strip 6 from the terminal strip reel 5.

As described above, without support for the rotation of the terminal strip reel 5 by the interleaf take-up device 50, all of the force for dispensing the terminal strip 6 is applied to the terminal strip 6 engaged with the feed jaw 32*a* of the terminal strip feeder 32. The greater the force applied to the terminal strip 6, the greater the risk of damaging the terminal strip 6, and it is therefore preferred to support the rotation of the terminal strip reel 5 by the interleaf take-up device 50. With the feeder and crimper 10 according to the present preferred embodiment, it is possible to support the rotation of the terminal strip reel 5 via the interleaf take-up device 50 to reduce the force applied to the terminal strip 6.

When the length by which the terminal strip 6 has been dispensed by the terminal strip feeder 32 is larger than the length by which the interleaf 7 has been taken up by the interleaf take-up device 50, a portion of the interleaf 7 is left slack without being taken up onto the interleaf take-up reel 60. Such slack in the interleaf 7 is preferably removed by taking up the interleaf 7 by the interleaf take-up reel 60. In such a case, the user may temporarily stop the feeding/crimping operation of the terminal strip 6. Thereafter, the user may disengage the plunger 74*c* from the interleaf take-up reel 60. The user may further use the operation screen 93 to take up the interleaf 7, i.e., perform the operation of independently driving the interleaf take-up device 50.

In the present preferred embodiment, when the operation of taking up the interleaf 7 is executed with the plunger 74*c* disengaged from the interleaf take-up reel 60, the drive motor 71 is driven and the rotation shaft 74 rotates. While there is slack in the interleaf 7, the interleaf take-up reel 60 rotates together with the rotation shaft 74. This causes the interleaf 7 to be taken up onto the interleaf take-up reel 60. When there is no more slack in the interleaf 7 as the interleaf 7 is taken up onto the interleaf take-up reel 60, the rotational load on the terminal strip reel 5 acts upon the interleaf 7 and the second connecting portion C2 and the collar 64 stars slipping against each other. Thus, it is possible to take up the interleaf 7 without unnecessary rotation of the terminal strip reel 5.

As described above, the driver 70 is configured to change the rotational torque applied to the interleaf take-up reel 60 depending on whether the plunger 74*c* is engaged with the interleaf take-up reel 60. Specifically, the driver 70 is configured so as to apply, to the interleaf take-up reel 60, a first torque that is sufficient to rotate the terminal strip reel 5 about the support 20, and a second torque that is smaller than the first torque and is insufficient to rotate the terminal strip reel 5 about the support 20. The first torque is a torque that is obtained when the first connecting portion C1 is engaged with the interleaf take-up reel 60, and is equal or substantially equal to the rotational torque that the rotation shaft 74 is capable of producing. The second torque is a torque that is obtained when the first connecting portion C1 is disengaged from the interleaf take-up reel 60, and is equal or substantially equal to the rotational torque that can be transmitted by friction between the second connecting portion C2 and the interleaf take-up reel 60.

Note that the operation of taking up the slack interleaf 7 as described above may be performed by the user by manually rotating the interleaf take-up reel 60. The operation of taking up the interleaf 7 before starting the feeding/crimping operation of the terminal strip 6 may be performed by driving the drive motor 71 with the first connecting portion C1 disengaged from the interleaf take-up reel 60.

When all the terminals of the terminal strip 6 have been crimped, the interleaf 7 is preferably rewound onto the core 8 of the terminal strip reel 5 for disposal of the interleaf 7. In this operation, the user first disengages the first connecting portion C1 from the interleaf rewind reel 60. Then, the user rotates the terminal strip reel 5 counterclockwise as viewed from the front. In this process, the interleaf take-up reel 60 in such a state it can be freely manually rotated, and the interleaf 7 is taken up onto the core 8 of the terminal strip reel 5.

The abnormality process to be performed when an abnormality occurs in the feeder and crimper 10 according to the present preferred embodiment will now be described. A first abnormality is when the plunger 74*c* fails to be engaged with the interleaf take-up reel 60 before the start of the feeding/crimping operation of the terminal strip 6. Such a situation can occur, for example, when the user forgets to engage the plunger 74*c* with the interleaf take-up reel 60. In this case, the interleaf take-up device 50 hardly contributes to the rotation of the terminal strip reel 5. Therefore, a larger load than normal is applied to the terminal strip 6 by the terminal strip feeder 32.

As described above, the feeder and crimper 10 is configured to issue a warning when a signal from the tension detector 80 has been received continuously over an amount of time that exceeds a predetermined amount of time. When the feeding/crimping operation of the terminal strip 6 is started without the plunger 74*c* engaged with the interleaf take-up reel 60, the terminal strip 6 will always be in a tensioned state. As a result, the tension detector 80 is constantly transmitting the signal. During normal operation, the terminal strip 6 alternates between being tensioned and being slightly slack due to the pull from the terminal strip feeder 32 and the push from the interleaf take-up device 50. Therefore, based on whether the amount of time over which the signal from the tension detector 80 has been received continuously exceeds a predetermined amount of time, it is possible to detect an abnormality.

Upon detecting an abnormality as described above, the feeder and crimper 10, for example, sounds a buzzer, lights an indicator light, or stops the feeding/crimping operation of the terminal strip 6. Note however that there is no particular limitation on the type of warning operation.

A second abnormality is when an abnormal force is being required to rotate the interleaf take-up reel 60. Such a situation can occur, for example, when something becomes entangled in the interleaf take-up reel 60, the support 20 or the terminal strip reel 5. When such an abnormality occurs and if no abnormality measure is taken, the rotational torque of the rotation shaft 74 will continue to be applied to the interleaf take-up reel 60, which is stuck and not rotatable, thus possibly damaging the first connecting portion C1 and the engagement hole 63*c*. It may also overload the drive motor 71.

In order to address such an abnormality, the feeder and crimper 10 according to the present preferred embodiment is configured so that the belt 73 slips against the first pulley 72 and the second pulley 75 when the rotational load on the interleaf take-up reel 60 is equal to or greater than a predetermined load (hereinafter referred to as the second load). The second load is larger than the first load at which the second connecting portion C2 begins to slip against the collar 64, and is set to a load that will not damage the first connecting portion C1 and the engagement hole 63*c* even when applied continuously over time. Specifically, a round belt is used as the belt 73, thus reducing the frictional force generated between the belt 73 and the first pulley 72 and the second pulley 75. Thus, the belt 73 more easily slips against the first pulley 72 and the second pulley 75. When the rotational load on the interleaf take-up reel 60 is equal to or greater than the second load, the belt 73 slides against the first pulley 72 and the second pulley 75, thus preventing an excessive force from being applied to the first connecting portion C1 and the engagement hole 63*c*. Also, the drive shaft 71*a* of the drive motor 71 rotates. Thus, it is possible to reduce the risk of damaging the first connecting portion C1 or other portions and the risk of overloading the drive motor 71.

Note that when the rotational load on the interleaf take-up reel 60 is equal to or greater than the second load, the belt 73 does not need to slide against both the first pulley 72 and the second pulley 75, but may slide only against one of them. When the rotational load on the interleaf take-up reel 60 is equal to or greater than the second load, the belt 73 only needs to slip against at least one of the first pulley 72 and the second pulley 75.

Variations of First Preferred Embodiment

The feeder and crimper 10 according to the first preferred embodiment can also be implemented by some variations. Note that in the following description of variations, members that perform the same function as those of the first preferred embodiment will be denoted by the same reference signs. The same applies also to the second and subsequent preferred embodiments and variations thereof.

For example, in one preferred variation, a movable shaft that is inserted into and detached from the engagement hole 63*c* may be moved by an actuator. For example, the actuator may be an air cylinder, and the movable shaft may be a telescoping shaft of the air cylinder. The feeder and crimper 10 may further include a solenoid valve that controls the supply of compressed air into the air cylinder, for example. The solenoid valve may be connected to the controller 90 and automatically controlled. Note however that there is no particular limitation on the actuator and the method for controlling the actuator.

According to a configuration in which the insertion and the detachment of the movable shaft into and from the engagement hole 63*c* can be automatically controlled, there is no need for the process of inserting the movable shaft into the engagement hole 63*c*, thus eliminating the possibility of forgetting to perform the process and the possibility of making errors in the process. With such a configuration, the controller 90 may be set to control the driver 70 to rotate the rotation shaft 74 with the movable shaft disengaged from the interleaf take-up reel 60 (in other words, to apply the second torque to the interleaf take-up reel 60) in response to an operation to start the feeding of the terminal strip 6. Thus, if there is slack in the interleaf 7 before the operation to start the feeding of the terminal strip 6, the feeding of the terminal strip 6 can be started after automatically removing the slack in the interleaf 7. Since the rotational torque of the interleaf take-up reel 60 is the second torque, the terminal strip reel 5 is not rotated unnecessarily by taking up the slack in the interleaf 7.

Note that by further providing a sensor for detecting slack in the interleaf 7, the feeder and crimper 10 can also automatically remove slack in the interleaf 7 if slack occurs in the interleaf 7 before or during the operation of feeding the terminal strip 6.

In still another variation, the feeder and crimper 10 may include a sensor that detects the insertion and the detachment of the movable shaft into and from the engagement hole 63*c*. The insertion and the detachment of the movable shaft into and from the engagement hole 63*c* may be performed by the user. Such a sensor can also reduce the possibility that the user may forget to perform, or make errors in, the process of inserting the movable shaft into the engagement hole 63*c* or the process of detaching the movable shaft from the engagement hole 63*c*. The controller 90 may be set to prohibit subsequent processes if the process of inserting the movable shaft into the engagement hole 63*c* or the process of detaching the movable shaft from the engagement hole 63*c* is not performed properly.

The method of connecting together the first connecting portion and the interleaf take-up reel is not limited to the method of inserting and detaching the movable shaft into and from the engagement hole. There is no limitation on the first connecting portion as long as it can be selectively engaged with or disengaged from the interleaf take-up reel. For example, the first connecting portion and the corresponding portion of the interleaf take-up reel may have gear-shaped or cam-shaped engagement portions. The movable direction of the first connecting portion (e.g., the movable direction of the movable shaft) is not limited to the axial direction of the rotation shaft, but may be the radial direction of the rotation shaft, for example. The same applies also to the contact surface between the second connecting portion and the interleaf take-up device, there is no limitation on the direction in which the contact surface faces. For example, the contact surface between the second connecting portion and the interleaf take-up device may face a direction that is parallel or substantially parallel to the axis of the rotation shaft and the central axis of the interleaf take-up reel.

Second Preferred Embodiment

Figure 6:
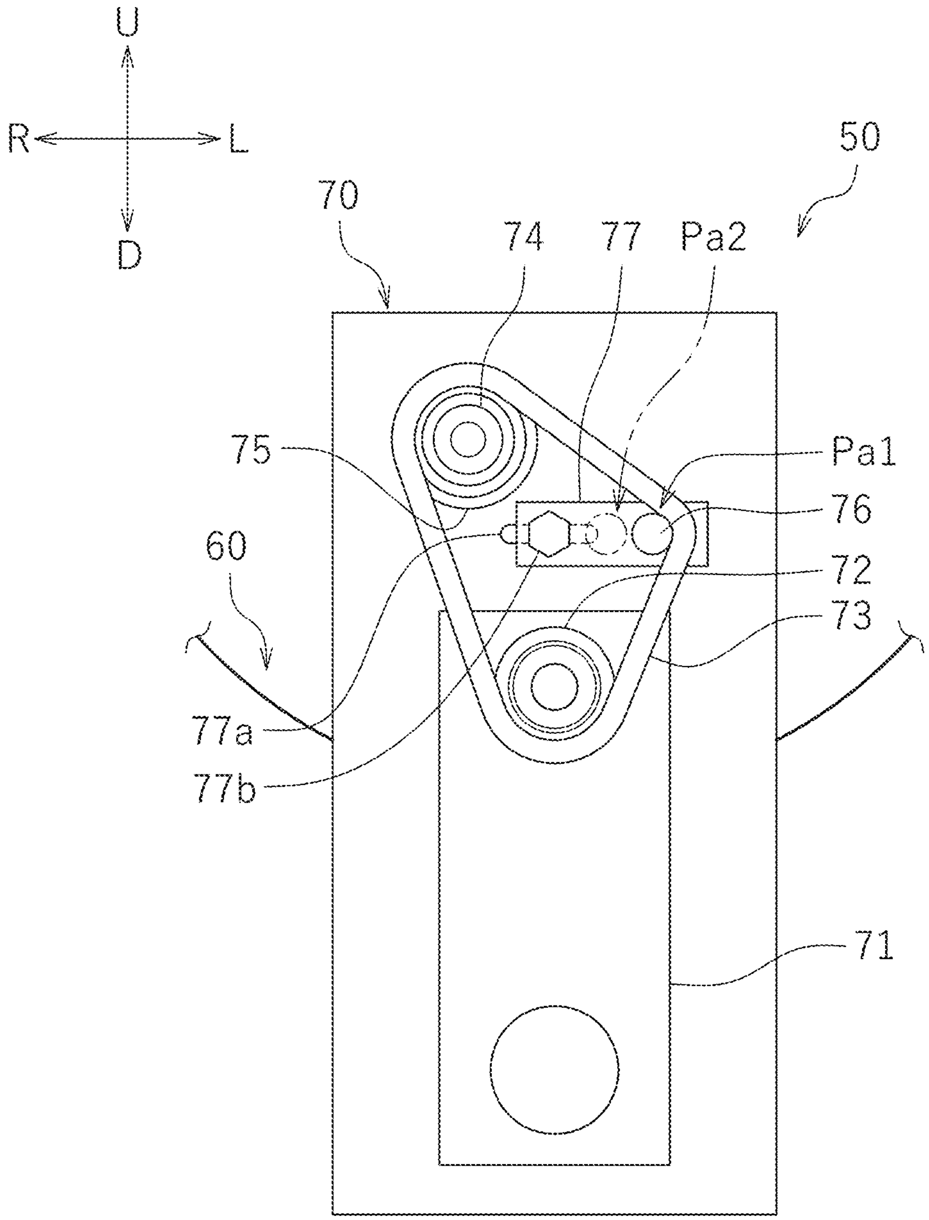
FIG. 6 is a rear view of an interleaf take-up device according to a second preferred embodiment of the present invention.

In the second preferred embodiment, the rotational torque and the braking force to be applied to the interleaf take-up reel 60 are changed in a manner different from the first preferred embodiment and variations thereof. FIG. 6 is a rear view of the interleaf take-up device 50 according to the second preferred embodiment. Although not shown in FIG. 6, in the present preferred embodiment, the driver 70 includes a connecting portion that connects together the rotation shaft 74 and the interleaf take-up reel 60. This connecting portion firmly connects together the rotation shaft 74 and the interleaf take-up reel 60 at all times, and the interleaf take-up reel 60 rotates together with the rotation shaft 74. There is no limitation on the configuration of the connecting portion. As shown in FIG. 6, the driver 70 according to the present preferred embodiment includes a tension roller 76, in addition to the drive motor 71, the first pulley 72, the belt 73, the rotation shaft 74 and the second pulley 75. Note that the drive motor 71 herein may be a DC motor that does not have the function of changing the rotational torque.

As shown in FIG. 6, the configurations of the drive motor 71, the first pulley 72, the belt 73, the rotation shaft 74 and the second pulley 75 in the present preferred embodiment are the same as the first preferred embodiment. The tension roller 76 is herein provided inward relative to the inner circumferential surface of the endless belt 73. The driver 70 includes a roller mover 77 that is capable of positioning the tension roller 76 at a first adjustment position Pa1 (shown in a solid line) at which the tension roller 76 contacts the inner circumferential surface of the belt 73 and at a second adjustment position Pa2 (shown in a two-dot chain line), which is inward relative to the first adjustment position Pa1. Note however that the tension roller 76 may be provided outward relative to the outer circumferential surface of the endless belt 73. In such a case, the roller mover 77 may be capable of positioning the tension roller 76 at an alternative first adjustment position at which the tension roller 76 contacts the outer circumferential surface of the belt 73 and at an alternative second adjustment position that is outward relative to this alternative first adjustment position.

The first adjustment position Pa1 is a position of the tension roller 76 such as to push the endless belt 73 from inside to outside. The second adjustment position Pa2 is a position of the tension roller 76 that is inward relative to the first adjustment position Pa1, and while at the second adjustment position Pa2, the tension roller 76 may or may not be in contact with the inner circumferential surface of the belt 73. In either case, the tension of the belt 73 when the tension roller 76 is positioned at the second adjustment position Pa2 is smaller than the tension of the belt 73 when the tension roller 76 is positioned at the first adjustment position Pa1. The tension roller 76 and the roller mover 77 are an example of a tension adjuster capable of adjusting the tension of the belt 73.

The roller mover 77 supports the tension roller 76 and moves in the radial direction of the belt 73. The roller mover 77 may be configured as shown in FIG. 6, for example, including an elongate hole 77*a* and a bolt and nut 77*b* so that the tension roller 76 can be fixed at the first adjustment position Pa1 or the second adjustment position Pa2. The roller mover 77 may include an actuator for moving the tension roller 76. If the roller mover 77 includes an actuator, the actuator may be controlled by the controller 90. There is no particular limitation on the configuration of the roller mover 77.

In the present preferred embodiment, the rotational torque and the braking force to be applied to the interleaf take-up reel 60 are changed by changing the tension of the belt 73. The frictional force between the belt 73 and the first pulley 72 and the second pulley 75 increases as the tension of the belt 73 increases, and decreases as the tension of the belt 73 decreases. When the rotational load on the interleaf take-up reel 60 exceeds the static frictional force between the belt 73 and the first pulley 72 and the second pulley 75, the belt 73 slips against the first pulley 72 and the second pulley 75. This static frictional force between the belt 73 and the first pulley 72 and the second pulley 75 can be changed based on the position of the tension roller 76. Therefore, with the tension roller 76 and the roller mover 77, it is possible to change the rotational torque and the braking force to be applied by the driver 70 to the interleaf take-up reel 60.

The rotational torque to be applied to the interleaf take-up reel 60 when the tension roller 76 is positioned at the first adjustment position Pa1 is preferably a torque that is sufficient to rotate the terminal strip reel 5 about the support 20. The rotational torque to be applied to the interleaf take-up reel 60 when the tension roller 76 is positioned at the second adjustment position Pa2 is preferably a torque that is insufficient to rotate the terminal strip reel 5 about the support 20. The braking force to be applied to the interleaf take-up reel 60 when the tension roller 76 is positioned at the second adjustment position Pa2 may be a braking force such that the interleaf take-up reel 60 can be manually rotated against the force.

Variations of Second Preferred Embodiment

Figure 7:
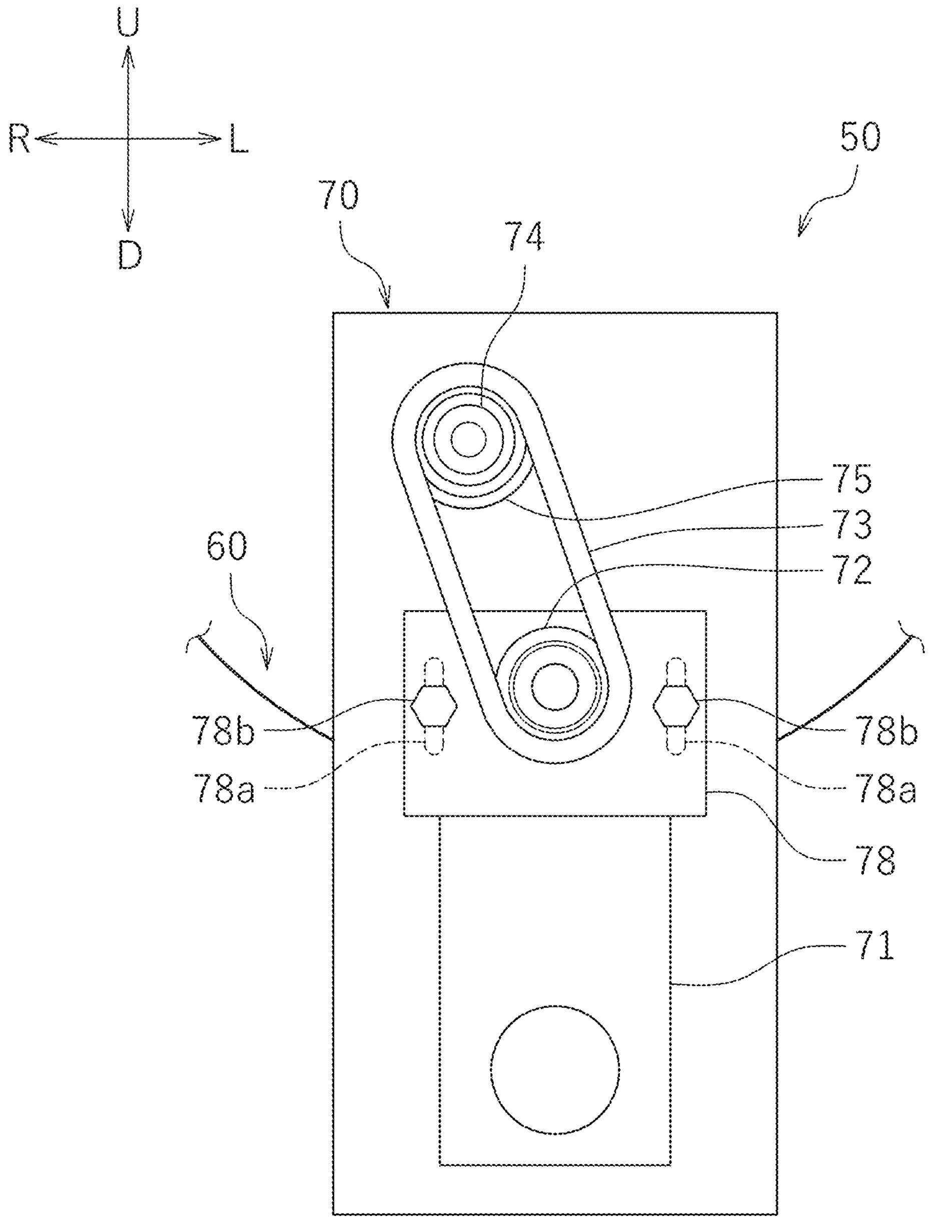
FIG. 7 is a rear view of an interleaf take-up device according to a variation of the second preferred embodiment of the present invention.

In a preferred variation of the second preferred embodiment, a tension adjuster for changing the tension of the belt 73 may include a distance adjuster 78 that supports the drive motor 71 so that the drive motor 71 is movable relative to the rotation shaft 74. FIG. 7 is a rear view of the interleaf take-up device 50 according to a variation of the second preferred embodiment. As shown in FIG. 7, the distance adjuster 78 moves the drive motor 71 relative to the rotation shaft 74 to change the distance between the drive motor 71 and the rotation shaft 74. Thus, the tension of the belt 73 is changed. Specifically, increasing the distance between the drive motor 71 and the rotation shaft 74 increases the tension of the belt 73. When the distance between the drive motor 71 and the rotation shaft 74 is shortened, the tension of the belt 73 decreases.

The distance adjuster 78 may include an elongate hole 78*a* and a bolt and nut 78*b* as shown in FIG. 7, for example, so that the drive motor 71 can be fixed at two or more positions at different distances from the rotation shaft 74. The distance adjuster 78 may include an actuator for moving the drive motor 71. If the distance adjuster 78 includes an actuator, the actuator may be controlled by the controller 90. Note however that there is no particular limitation on the configuration of the distance adjuster 78.

Other Preferred Embodiments

Some preferred embodiments of the present invention have been described above. However, these preferred embodiments are merely illustrative, and various other preferred embodiments are possible.

For example, in the preferred embodiments described above, the rotational torque and the braking force to be applied to the interleaf take-up reel 60 is changed based on whether the connection between the rotation shaft 74 and the interleaf take-up reel 60 or between the rotation shaft 74 and the drive shaft 71*a* of the drive motor 71 is a strong connection or a weak connection. However, the method of changing the rotational torque and the braking force at the time of stopping that are to be applied by the driver to the interleaf take-up reel is not limited to this. For example, the driver may include a drive motor whose rotational torque can be controlled.

The number of different rotational torques to be applied by the driver to the interleaf take-up reel is not limited to two. For example, the driver may be capable of applying, to the interleaf take-up reel, three or more different rotational torques, including a first torque that is sufficient to rotate the terminal strip reel about the support and a second torque that is smaller than the first torque and is insufficient to rotate the terminal strip reel about the support.

The method of switching the connection between the drive motor and the interleaf take-up reel between a strong connection and a weak connection is also not limited to that described above. For example, the rotation of the drive shaft of the drive motor may be transmitted to the rotation shaft without a mechanism such as a belt therebetween. Alternatively, the rotation of the drive shaft of the drive motor may be transmitted to the rotation shaft via a non-contact power transmission device such as magnetic gears, for example. For example, in the case of magnetic gears, the transmission of the driving force between gears is done via the magnetic force imparted to the gears, and the torque that can be transmitted is changed by changing the distance between the gears. Otherwise, there is no particular limitation on the method of changing the connection strength between the drive motor and the interleaf take-up reel.

The transmission torque can be changed while maintaining a strong connection between the driver and the interleaf take-up reel at all times. For example, the rotation of the drive shaft of the drive motor may be transmitted to the rotation shaft via a combination gear whose gear ratio can be changed. Also with such a configuration, it is possible to change the rotational torque and the braking force to be applied by the driver to the interleaf take-up reel. Note that the connection between the driver and the interleaf take-up reel may be disconnected. In such a case, the rotational torque and the braking force to be applied by the driver to the interleaf take-up reel will be zero.

There is no limitation on elements such as the support for rotatably supporting the terminal strip reel, the crimper for crimping terminals onto wires, and the terminal strip feeder for feeding the terminal strip to the crimper. Various devices known in the art can be suitably used for these devices. There is no limitation on the configuration of the tension detector, as long as the tension detector can detect the force applied to the terminal strip by the terminal strip feeder when feeding the terminal strip. Detecting the force applied by the terminal strip feeder to the terminal strip includes detecting whether the force applied by the terminal strip feeder to the terminal strip exceeds a predetermined force, as well as measuring the force applied by the terminal strip feeder to the terminal strip. Furthermore, there is no limitation on the configuration of the interleaf take-up device, e.g., the shape, arrangement, etc., of the parts of the interleaf take-up reel, as long as the function is realized.

The configuration and the control sequence of the controller 90 of the feeder and crimper 10 described above are merely preferred examples, and there is no limitation thereto. The preferred embodiments do not limit the present invention, except where specifically mentioned.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principles of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or referred to during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A terminal feeder and crimper comprising:
- a support to rotatably support a terminal strip reel obtained by winding together a terminal strip and an interleaf on top of each other;
- a crimper to crimp a terminal of the terminal strip onto a wire;
- a terminal strip feeder to feed the terminal strip dispensed from the terminal strip reel to the crimper;
- an interleaf take-up reel to take up the interleaf dispensed from the terminal strip reel; and
- a driver connected to the interleaf take-up reel to rotate the interleaf take-up reel; wherein
- the driver is capable of changing a rotational torque to be applied to the interleaf take-up reel and applying, to the interleaf take-up reel, at least two different rotational torques.

2. The terminal feeder and crimper according to claim 1, wherein the at least two different rotational torques include a first torque that is sufficient to rotate the terminal strip reel about the support and a second torque that is smaller than the first torque and is insufficient to rotate the terminal strip reel about the support.

3. The terminal feeder and crimper according to claim 2, further comprising:
- a controller that is connected to the driver and includes an interface used to perform a feed start operation to start feeding the terminal strip; wherein
- the controller is configured or programmed to control the driver to apply the second torque to the interleaf take-up reel when the feed start operation is performed.

4. The terminal feeder and crimper according to claim 1, wherein:
- the driver includes a rotation shaft that rotates; and
- the rotation shaft includes:
  - a first connecting portion that can be selectively engaged with or disengaged from the interleaf take-up reel; and
  - a second connecting portion that is secured by a frictional force to the interleaf take-up reel when a rotational load on the interleaf take-up reel is less than a predetermined first load, and slips against the interleaf take-up reel when the rotational load on the interleaf take-up reel is equal to or greater than the first load.

5. The terminal feeder and crimper according to claim 4, wherein:
- the first connecting portion includes a movable shaft capable of being positioned in a first position and a second position that is closer to the interleaf take-up reel than the first position; and
- the interleaf take-up reel includes an engagement hole; wherein
- the movable shaft is inserted into the engagement hole when the movable shaft is positioned in the second position, and the movable shaft is detached from the engagement hole when the movable shaft is positioned in the first position.

6. The terminal feeder and crimper according to claim 4, wherein the driver further includes:
- a drive motor that includes a drive shaft that rotates;
- a first pulley that is connected to the drive shaft;
- a second pulley that is connected to the rotation shaft; and
- an endless belt that is wound between the first pulley and the second pulley; wherein
- the endless belt is to slip against at least one of the first pulley and the second pulley when the rotational load on the interleaf take-up reel is equal to or greater than a second load that is larger than the first load.

7. The terminal feeder and crimper according to claim 1, further comprising:

a detector to detect a force applied to the terminal strip by the terminal strip feeder when feeding the terminal strip; and a warning device that is connected to the detector to issue a warning when the force detected by the detector has exceeded a predetermined force over an amount of time that exceeds a predetermined amount of time.

8. The terminal feeder and crimper according to claim 1, wherein the driver is capable of changing a braking force on the interleaf take-up reel when the interleaf take-up reel is stopped.

9. The terminal feeder and crimper according to claim 8, wherein the driver is capable of applying, to the interleaf take-up reel, a braking force that allows the interleaf take-up reel to be manually rotated against the braking force.

* * * * *